(12) United States Patent
Augenstein et al.

(10) Patent No.: US 8,181,536 B2
(45) Date of Patent: May 22, 2012

(54) ULTRASONIC FLOW METER INCLUDING A TRANSDUCER HAVING CONICAL FACE

(75) Inventors: Donald R. Augenstein, Pittsburgh, PA (US); Bobbie W. Griffith, Harrisville, PA (US)

(73) Assignee: Cameron International Corporation, Houston, TX (US)

( * ) Notice: Subject to any disclaimer, the term of this patent is extended or adjusted under 35 U.S.C. 154(b) by 302 days.

(21) Appl. No.: 12/653,913

(22) Filed: Dec. 19, 2009

(65) Prior Publication Data

US 2011/0146414 A1    Jun. 23, 2011

(51) Int. Cl.
*G01F 1/66* (2006.01)

(52) U.S. Cl. .................. 73/861.28; 73/861.25

(58) Field of Classification Search .................. None
See application file for complete search history.

(56) References Cited

U.S. PATENT DOCUMENTS

| | | | | |
|---|---|---|---|---|
| 2,865,196 A * | 12/1958 | Bordenave et al. | ........ | 73/861.31 |
| 4,031,757 A * | 6/1977 | Colton | ........ | 73/861.23 |
| 4,237,729 A * | 12/1980 | McLeod et al. | ........... | 73/861.25 |
| 4,913,159 A * | 4/1990 | Gardin et al. | ............... | 73/861.25 |
| 5,383,369 A * | 1/1995 | Khuri-Yakub et al. | .... | 73/861.29 |
| 5,728,948 A * | 3/1998 | Bignell et al. | ............. | 73/861.28 |
| 6,089,104 A * | 7/2000 | Chang | ......................... | 73/861.27 |
| 6,539,812 B1 * | 4/2003 | Bergamini | ................. | 73/861.29 |
| 6,895,825 B1 * | 5/2005 | Barkhoudarian | .......... | 73/861.28 |
| 7,845,240 B1 * | 12/2010 | Stehouwer | ................. | 73/861.27 |
| 2002/0011119 A1 * | 1/2002 | Bignell et al. | ............. | 73/861.23 |
| 2007/0034016 A1 * | 2/2007 | Maginnis et al. | ......... | 73/861.28 |
| 2007/0227263 A1 * | 10/2007 | Fukano et al. | ............ | 73/861.27 |
| 2008/0289433 A1 * | 11/2008 | Lohrmann et al. | ......... | 73/861.25 |

* cited by examiner

*Primary Examiner* — Harshad Patel

(74) *Attorney, Agent, or Firm* — Ansel M. Schwartz

(57) ABSTRACT

An ultrasonic transducer for a pipe includes an ultrasonic source which produces plane waves. The transducer includes a housing having a face at least a portion of which is curved through which the plane waves produced from the source disposed in the housing are emitted and directed outward towards the pipe's interior wall so a full cross-section of the pipe's interior can be measured. A flow meter for detecting fluid flow rates in a pipe. A method for detecting fluid flow rates in a pipe.

10 Claims, 6 Drawing Sheets

ULTRASONIC FLOW METER INCLUDING A TRANSDUCER HAVING CONICAL FACE

FIELD OF THE INVENTION

The present invention is related to determining fluid flowrate in a pipe using an ultrasonic transducer. (As used herein, references to the "present invention" or "invention" relate to exemplary embodiments and not necessarily to every embodiment encompassed by the appended claims.) More specifically, the present invention is related to determining fluid flowrate in a pipe using an ultrasonic transducer where the face of the transducer has at a portion which is shaped such that it causes the plane waves generated by the transducer to be directed outward towards the pipe's interior wall so a full cross-section of the pipe's interior can be measured.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The current invention is applicable for measuring flow rates with ultrasonic transit time technology (e.g., ultrasonic flow meters, or UFM). The application is specifically developed for a flow meter to monitor chemical injection in subsea oil wells (typically injecting mono-ethylene glycol or MEG). This specific subsea application has flow rates that range from 100 liters/hr to 30,000 liters/hr. For this flow range and product viscosity—the Reynolds Number ranges from laminar flow to fully turbulent flow. This range of Reynolds Number produces velocity profiles that vary from parabolic to nearly flat. As a flow meter, the average velocity (e.g. integral of velocity profile divided by the area) must be measured.

The current ultrasonic flow meter arrangement uses in one embodiment two transducers at opposing ends of a pipe/tube where one is upstream from the fluid flow and other is downstream from the fluid flow, both transducers transmit and receive signals. Each transducer generates plane waves into the fluid. The difference in transit times between the upstream and downstream signal is used to calculate the velocity between the two transducers. This difference in transit time reflects the average fluid velocity projected onto the acoustic path.

Unless the transducer is larger than the diameter of the pipe/tube, the acoustic path measures a cross section of velocities that represent an area that is less than the full cross section of the pipe/tube. Only if the transducer is larger than the tube itself can the full cross section be measured. A transducer large enough to completely cover the pipe/tube cross section is not always possible or even practical depending upon the pipe/tube size or pressure (e.g., required wall thicknesses). Some UFM have used multiple bounces; but these multiple bounces cannot get the full cross section.

By measuring the full cross section, velocity profile effects are addressed (for example any distortions due to hydraulics or changes in the velocity profile due to transition from laminar to turbulent).

BRIEF SUMMARY OF THE INVENTION

The present invention pertains to the measurement of flowing fluid through a pipe. The measurement is performed with a transit time ultrasonic flow meter having transducers that are disposed in alignment with the fluid flow through the pipe. The radiation pattern of the plane waves produced by the transducers propagates through the flowing fluid in the pipe and is used by the flow meter to determine the flowrate of the fluid.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 2:
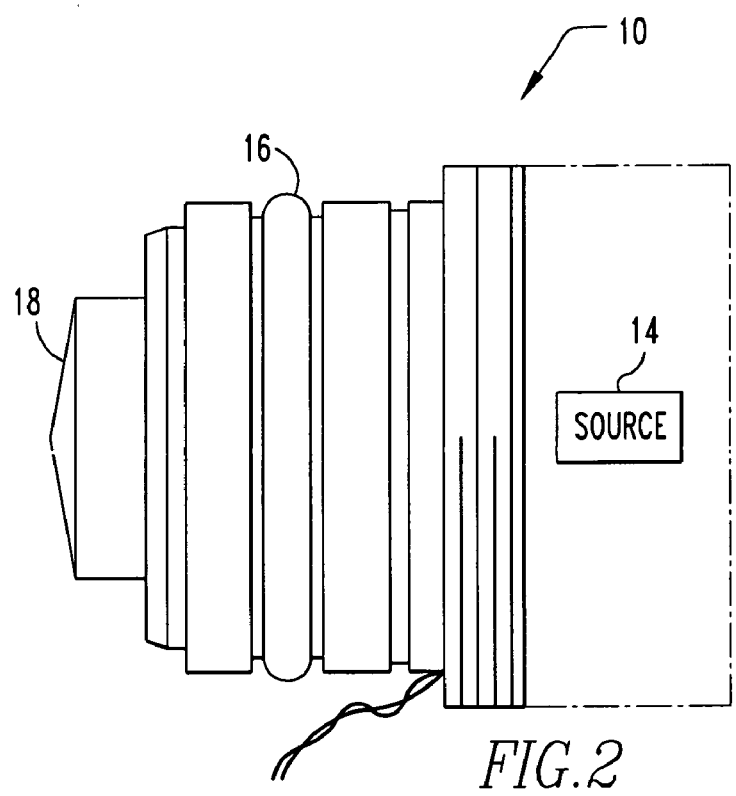
FIG. 2 is an example of a conical faced transducer.

Referring now to the drawings wherein like reference numerals refer to similar or identical parts throughout the several views, and more specifically to FIG. 2 thereof, there is shown an ultrasonic transducer 10 for a pipe 12. The transducer 10 comprises an ultrasonic source 14 which produces plane waves. The transducer 10 comprises a housing 16 having a face 18 at least a portion of which is curved through which the plane waves produced from the source 14 disposed in the housing 16 are emitted and directed outward towards the pipe's 12 interior wall 26 so a full cross-section of the pipe's 12 interior can be measured. See FIG. 3. The transducer 10 is a standard transducer 10 available from many suppliers, with the only difference being the face 18 has at least the portion which is shaped, as described above. The shaped portion of the face 18, which in one embodiment was made of stainless steel, causes the plane waves to refract as they propagate according to Snell's law through the face 18 and be directed outward toward the interior wall 26 of the pipe 12. Similarly, upon reception, the plane waves at various angles to the shaped portion of the face 18 are refracted back to an angle that can be captured by the transducer 10 according to Snell's law to produce a signal based on the flow rate, as is well known in the art.

At least a portion of the face 18 may be a portion of a cone. In one embodiment the face 18 may be conically shaped. A desired angle, φ desired, of the conical shape may be defined by $$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe 12, L is the length of the pipe 12, r is the radius of the transducer 10, $$\frac{\sin\phi_{face}}{C_{window}} = \frac{\sin\phi_{refract}}{C_{fluid}}$$

$$\phi_{Desired} = \phi_{face} - \phi_{refract}.$$

Figure 1:
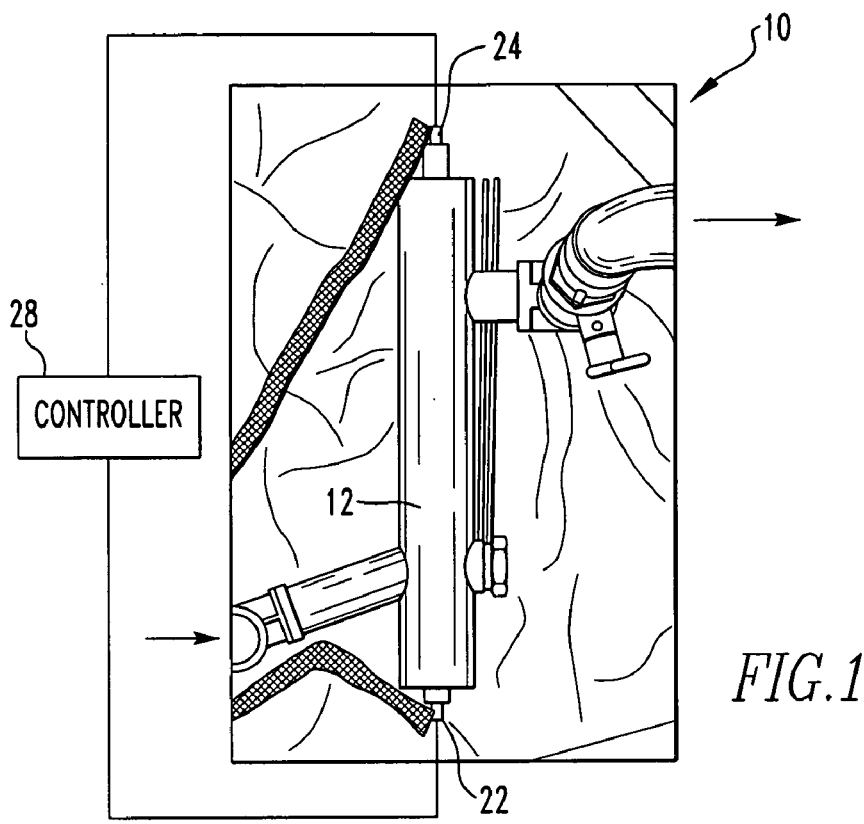
FIG. 1 is a standard design of the present invention.
Figure 5A:
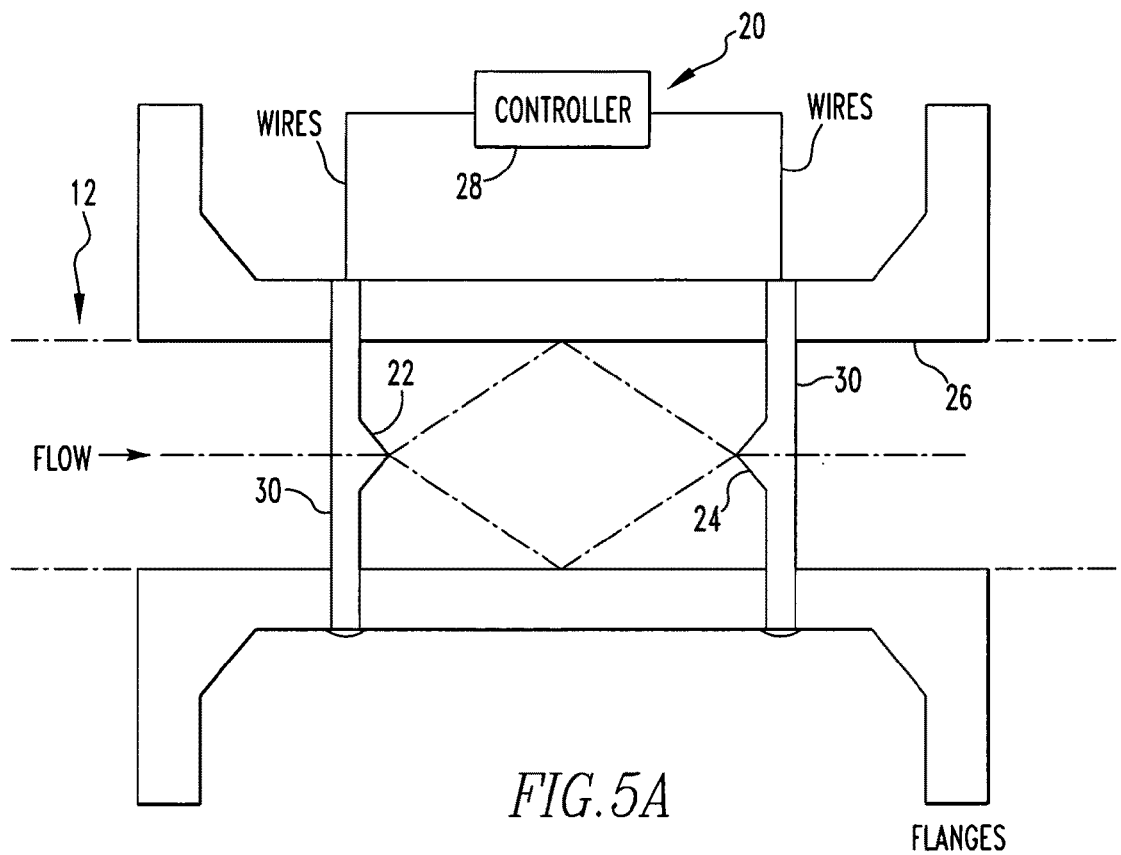
FIG. 5a shows an insertion transducer configuration.
Figure 5B:
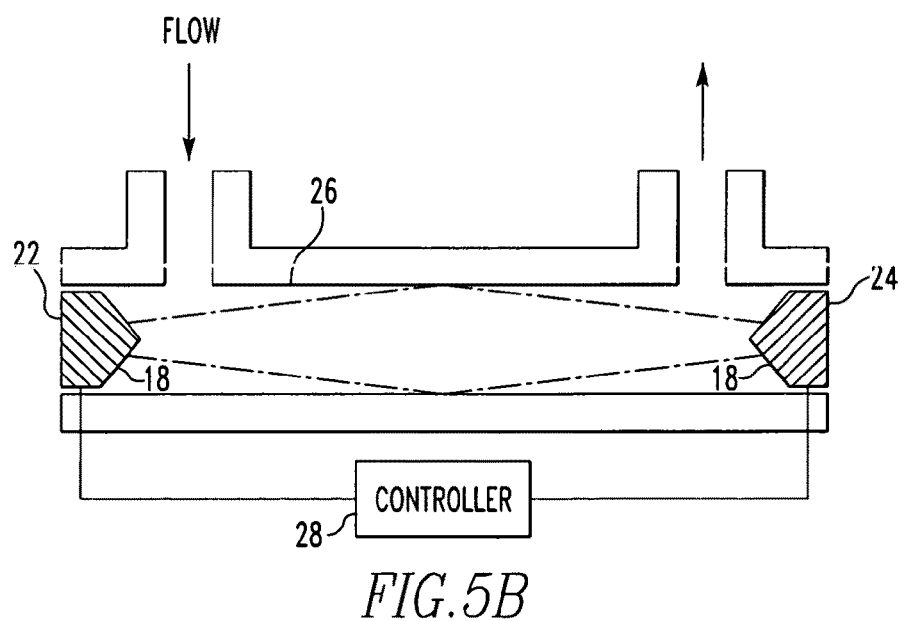
FIG. 5b shows an end cap transducer configuration.

The present invention pertains to a flow meter 20 for detecting fluid flow rates in a pipe 12, as shown in FIG. 1 and FIG. 5b. The flow meter 20 comprises an upstream ultrasonic transducer 22 having a face 18 at least a portion of which is shaped in communication with the pipe 12 interior and positioned so plane waves generated by the upstream transducer 22 are directed outward towards the pipe's interior wall 26 and propagate along the pipe's interior so a full cross-section of the pipe's interior can be measured. See FIG. 3. The flow meter 20 comprises a controller 28 in communication with the upstream transducer 22 which calculates fluid flow rate from the plane waves that have propagated along the pipe's interior. The calculation of fluid flow rate from the received plane waves is well known in the art. [Refer to Chapter 5 in: *Physical Acoustics—Principles and Methods*, W. P. Mason and R. N. Thurston (Editors), Vol. 14, pp. 407-525, Academic Press (1979), incorporated by reference herein].

The flow meter 20 may include a downstream ultrasonic transducer 24 having a face 18 at least a portion of which is curved in communication with the pipe's interior and positioned so plane waves generated by the downstream transducer 24 are directed outward towards the pipe's interior wall 26 and propagate along the pipe's interior so a full cross-section of the pipe's interior can be measured and are received by the upstream transducer 22 which produces an upstream transducer 22 signal. The downstream transducer 24 receives the plane waves from the upstream transducer 22 and provides a downstream transducer 24 signal. The controller 28 is in communication with the upstream and downstream transducers 24 which calculates fluid flow rate from the upstream transducer 22 signal and the downstream transducer 24 signal.

At least a portion of each face 18 may be a portion of a cone. Each face 18 may be conically shaped.

A desired angle, φ desired, of the conical shape may be defined by $$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe 12, L is the length of the pipe 12, r is the radius of the upstream transducer 22, $$\frac{\sin\phi_{face}}{C_{window}} = \frac{\sin\phi_{refract}}{C_{fluid}}$$

$$\phi_{Desired} = \phi_{face} - \phi_{refract}.$$

Figure 9:
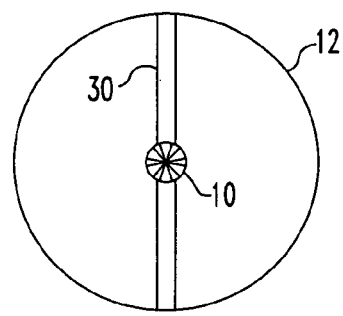
FIG. 9 shows an axial view of an insertion transducer with a single support.
Figure 10:
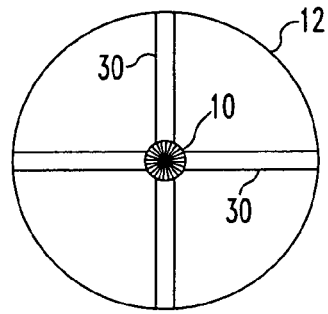
FIG. 10 shows an axial view of an insertion transducer with a double support.
Figure 11:
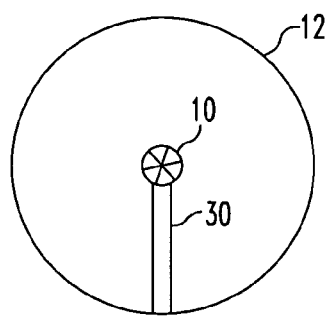
FIG. 11 shows an axial view of an insertion transducer with a cantilevered support.

The flow meter 20 may include a support 30 that extends from the pipe 12 wall 26 into the pipe 12 interior upon which the upstream transducer 22 is mounted. See FIG. 5a. FIG. 9 shows a single support 30. FIG. 10 shows a double support 30 and FIG. 11 shows a cantilevered support 30.

The present invention pertains to a method for detecting fluid flow rates in a pipe 12. The method comprises the steps of generating plane waves by an upstream transducer 22 having a face 18 at least a portion of which is curved in communication with the pipe 12 interior and positioned so plane waves are directed outward towards the pipe's interior wall 26 and propagate along the pipe's interior so a full cross-section of the pipe's interior can be measured. There is the step of calculating fluid flow rate from the plane waves that have propagated along the pipe's interior with a controller 28 in communication with the upstream transducer 22.

There can be the steps of generating plane waves with a downstream ultrasonic transducer 24 having a face 18 at least a portion of which is curved and in communication with the pipe's interior and positioned so the plane waves are directed outward towards the pipe's interior wall 26 and propagate along the pipe's interior so a full cross-section of the pipe's interior can be measured. There can be a step of receiving the plane waves generated by the downstream transducer 24 at the upstream transducer 22 which produces an upstream transducer 22 signal. There can be the step of receiving the plane waves generated by the upstream transducer 22 at the downstream transducer 24 which produces a downstream transducer 24 signal. There can be the step of providing to the controller 28 in communication with the upstream and downstream transducers the upstream and downstream signals. There can be the step of calculating with the controller 28 fluid flowrate from the upstream transducer 22 signal and the downstream transducer 24 signal.

At least a portion of each face 18 may be a portion of a cone. Each face 18 may be conically shaped. A desired angle, φ desired, of the conical shape may be defined by $$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe 12, L is the length of the pipe 12, r is the radius of the transducer 10, $$\frac{\sin\phi_{face}}{C_{window}} = \frac{\sin\phi_{refract}}{C_{fluid}}$$

$$\phi_{Desired} = \phi_{face} - \phi_{refract}.$$

In the operation of the invention, one pair of transducers is used to ensonify the full cross section of the measuring tube or pipe. The end result is a time of flight measurement that reflects the full cross section of velocities. This produces a flow meter that is essentially insensitive to changes in viscosity (e.g., Reynolds number) and upstream hydraulics. The present invention uses a transducer 10 having a face 18 at least a portion of which is curved face 18, and ideally is of a conical shape. The angle of the cone is designed based on the length and size of the measurement tube. The angle of the cone considers refraction (due to Snell's law). The effect of refraction is computed to be insignificant. This conical face 18 makes the acoustic energy radiate out to the sides of the tube from the center of the transducer 10. At the walls, the sound then reflects back to the center. The result is that the flow meter measures the full cross section of the measuring tube.

Figure 3A:
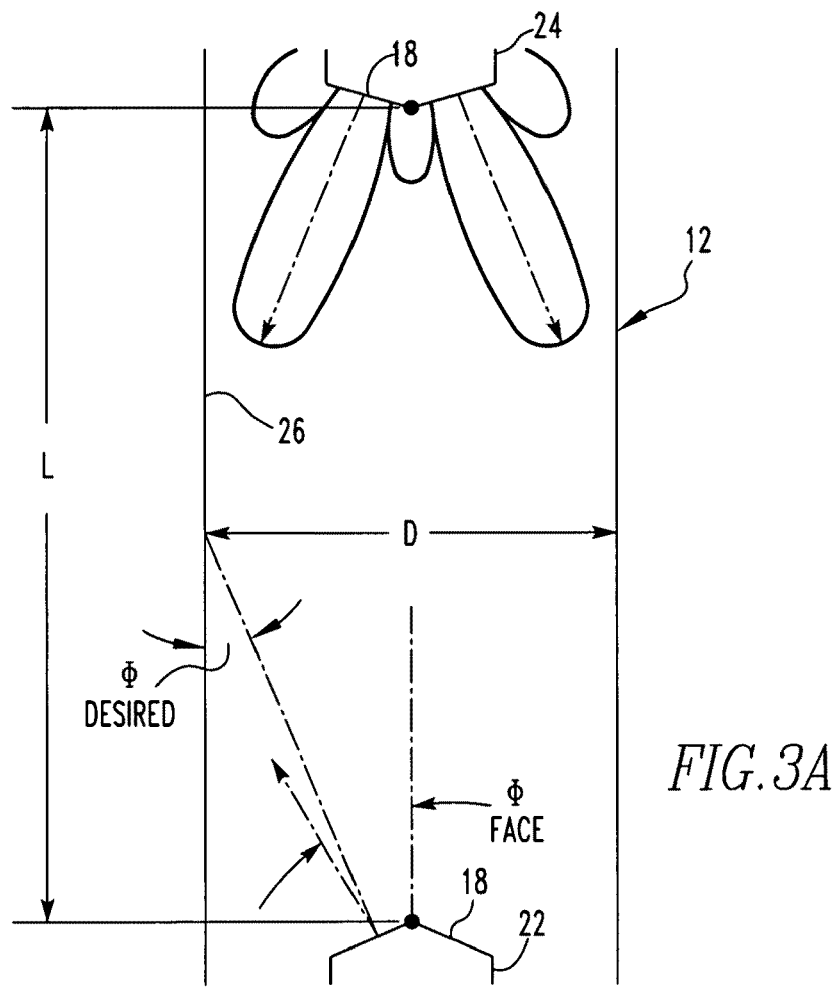
FIG. 3 shows the calculation of the transducer face angles.
Figure 3B:
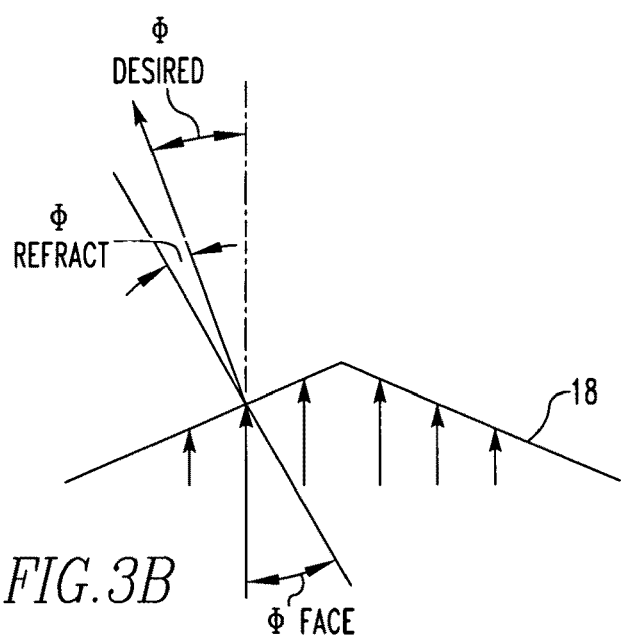

The transducers were at opposing ends of the tube. See FIG. 1. FIG. 1 is a standard design of the present invention. The standard transducer 10 window face 18 (the side facing the fluid) is typically flat. The present invention puts a conical face 18 to refract the sound out to the walls. See FIG. 2. FIG. 2 is an example of a conical faced transducer 10. The design of the conical face 18 depends upon the dimensions of the measuring tube and the refraction due to the fluid to transducer 10 face 18 interface (e.g., Snell's law). The following calculation is set out with reference to FIG. 3, which also shows an example antenna pattern. FIG. 3 shows the calculation of the transducer 10 face angles.

A desired angle, φ desired, of the conical shape may be defined by $$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe 12, L is the length of the pipe 12, r is the radius of the transducer 10, $$\frac{\sin\phi_{face}}{C_{window}} = \frac{\sin\phi_{refract}}{C_{fluid}}$$

$$\phi_{Desired} = \phi_{face} - \phi_{refract}.$$

Figure 4:
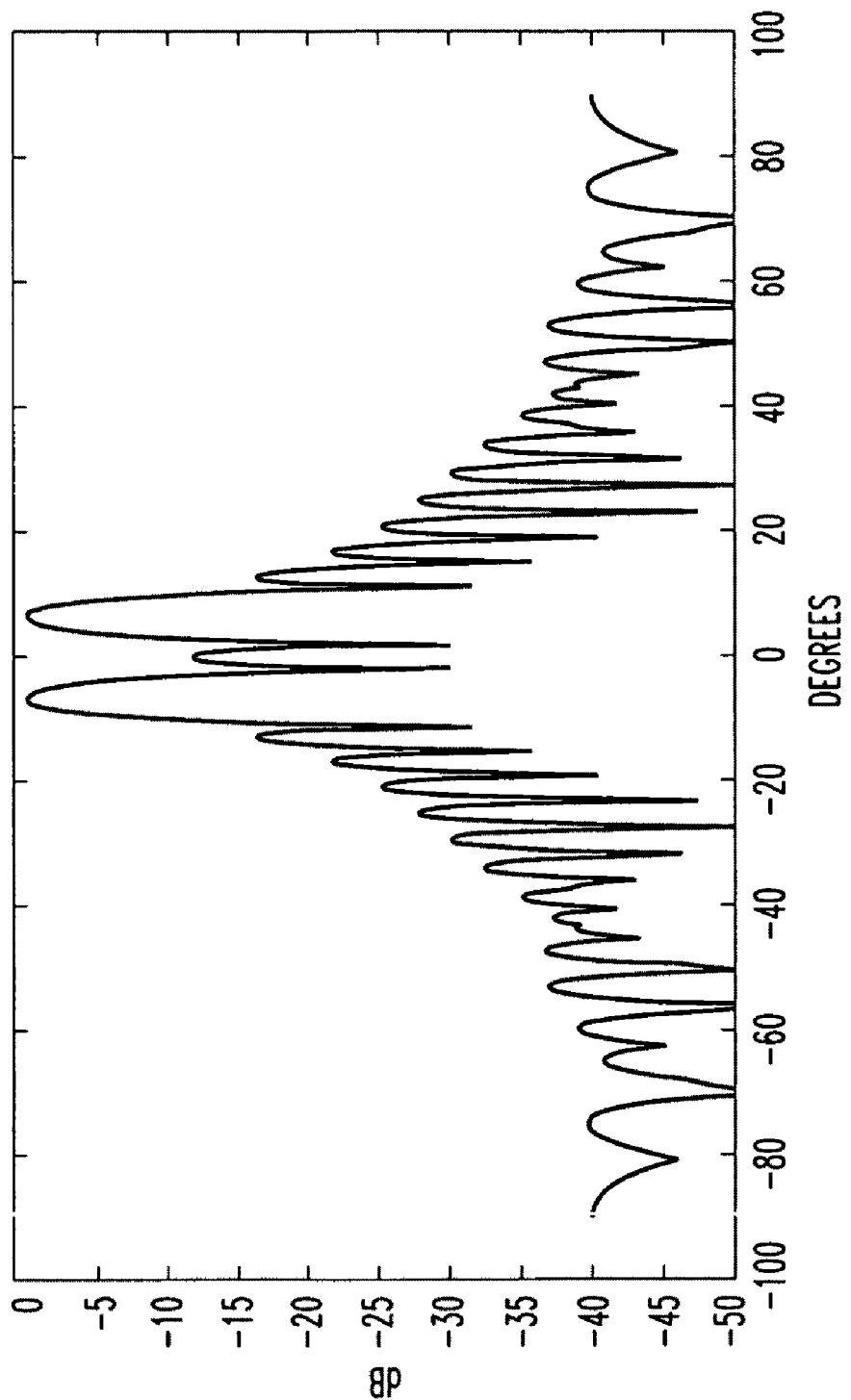
FIG. 4 shows an antenna pattern for transducer shown in FIG. 2.

The radiation pattern or antenna pattern of the transducer face 18 results in a spreading conical pattern (that is, until it hits the walls, at which point it becomes a focusing cone). The antenna pattern for one transducer 10 built (see FIG. 2) is shown in FIG. 4. This antenna had 3.5 MHz transducers, a 12.7 mm diameter transducer and the media had sound velocity of 1500 m/s. FIG. 4 shows an antenna pattern for transducer 10 shown in FIG. 2.

The design of flow meters 20 need not be limited to meters that have the transducers at the ends of tubes. The principles can be used in other arrangements—for examples, FIG. 5a and FIG. 5b. FIG. 5a shows an insertion transducer 10 configuration. FIG. 5b shows an end cap transducer 10 configuration. There are arrangements at which the transducer 10 maybe be along one side or the other that uses a portion of a cone to radiate across the pipe 12 using the opposing side as a reflection source 14.

Figure 6:
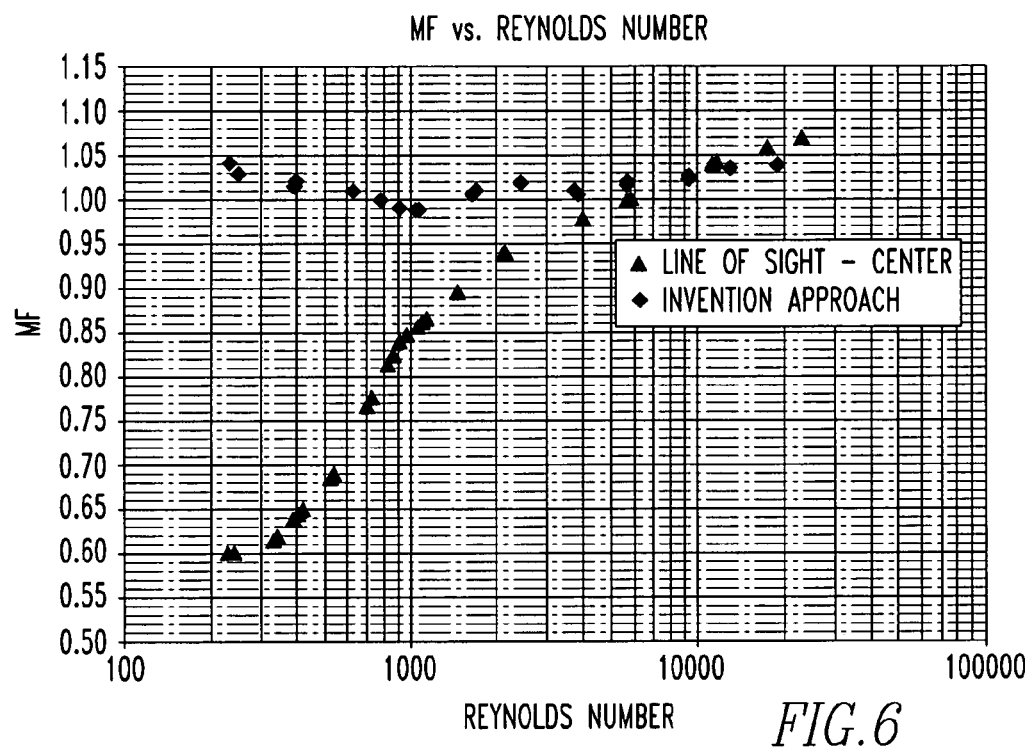
FIG. 6 is an example of improved linearity possible by integrating the full cross section.
Figure 7:
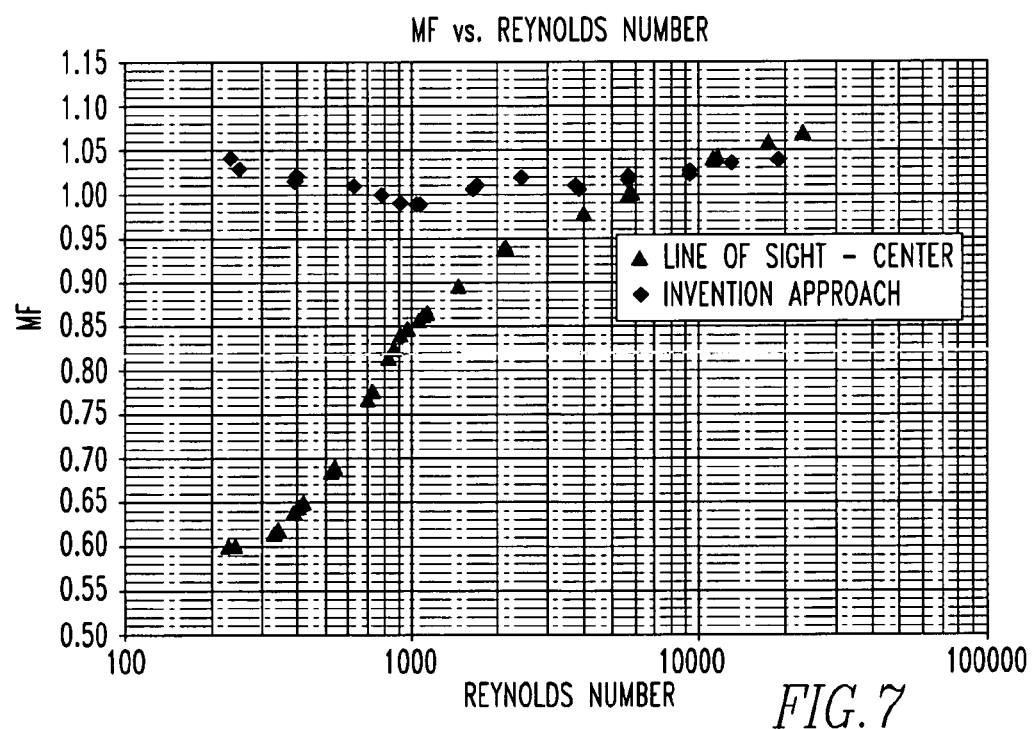
FIG. 7 shows that change the viscosity from 10 cSt to 20 cSt to 50 cSt has no effect on the linearity, even over a 200:1 Reynolds number range.
Figure 8:
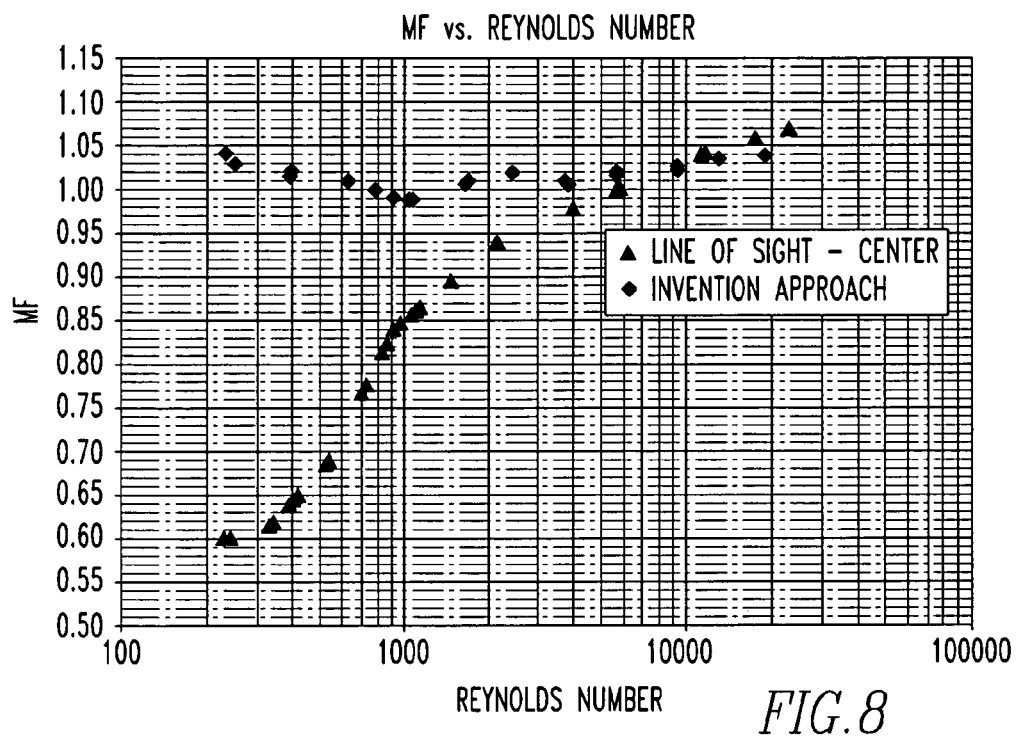
FIG. 8 shows linearity insensitivity to hydraulic changes.

An example of the inventions improved linearity is demonstrated in FIG. 6. The figure shows the real performance improvement possible with the invention. The standard line of sight approach is represented by triangles. This standard meter had a 0.5 inch transducer 10 in a 1.5 inch diameter tube. FIG. 6 is an example of improved linearity possible by integrating the full cross section. FIG. 7 shows that change the viscosity from 10 cSt to 20 cSt to 50 cSt has no effect on the linearity, even over a 200:1 Reynolds number range. FIG. 8 shows linearity insensitivity to hydraulic changes. FIG. 8 shows that changes in the hydraulics (from a 90 elbow nonplanar coupled with the 70 degree elbow, to three non-planar 90 degree elbows to one planar elbow, the linearity is unaffected. The present invention is not limited to a chemical injection meter since the invention solves the velocity profile integration problem.

FIGS. 9, 10 and 11 show an axial view of a transducer 10 with a single support 30, double supports 30 and a cantilevered support 30, respectively.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An ultrasonic transducer for a pipe comprising:
an ultrasonic source which produces plane waves in a fluid flow; and
a housing having a face at least a portion of which is curved through which the plane waves produced from the source disposed in the housing are emitted and directed outward towards the pipe's interior wall so a full cross-section of the fluid flow in the pipe's interior can be measured, wherein a desired angle, φ desired, of the conical shape is defined by:

$$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe, L is the length of the pipe, r is the radius of the transducer, $$\frac{\sin\phi_{face}}{C_{window}} = \frac{\sin\phi_{refract}}{C_{fluid}}$$

$$\phi_{Desired} = \phi_{face} - \phi_{refract}.$$

2. The transducer of claim 1 wherein at least a portion of the face is a portion of a cone.

3. The transducer of claim 2 wherein the face is conically shaped.

4. A flow meter for detecting fluid flow rates in a pipe comprising:
an upstream ultrasonic transducer having a face at least a portion of which is curved in communication with the pipe interior and positioned so plane waves generated by the upstream transducer are directed outward towards the pipe's interior wall and propagate along the pipe's interior so a full cross-section of the fluid flow in the pipe's interior can be measured;
a controller in communication with the upstream transducer which calculates fluid flow rate from the plane waves that have propagated along the pipe's interior; and
a downstream ultrasonic transducer having a face at least a portion of which is curved in communication with the pipe's interior and positioned so plane waves generated by the downstream transducer are directed outward towards the pipe's interior wall ad propagate along the pipe's interior so a full cross-section of the fluid flow in the pipe's interior can be measured and are received by the upstream transducer which produces an upstream transducer signal, the downstream transducer receiving the plane waves from the upstream transducer and providing a downstream transducer signal, the controller in communication with the upstream and downstream transducers which calculates fluid flow rate from the upstream transducer signal and the downstream transducer signal, wherein a desired angle, φ desired, of the conical shape is defined by:

$$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe, L is the length of the pipe, r is the radius of the transducer, $$\frac{\sin\phi_{face}}{C_{window}} = \frac{\sin\phi_{refract}}{C_{fluid}}$$

$$\phi_{Desired} = \phi_{face} - \phi_{refract}.$$

5. The flow meter of claim 4 wherein at least a portion of each face is a portion of a cone.

6. The flow meter of claim 5 wherein each face is conically shaped.

7. The flow meter of claim 6 including a support that extends from the pipe wall into the pipe interior upon which the upstream transducer is mounted.

8. A method for detecting fluid flow rates in a pipe comprising the steps of:

generating plane waves by an upstream transducer having a face at least a portion of which is curved in communication with the pipe interior and positioned so plane waves are directed outward towards the pipe's interior wall and propagate along the pipe's interior so a full cross-section of the fluid flow in the pipe's interior can be measured; and calculating fluid flow rate from the plane waves that have propagated along the pipe's interior with a controller in communication with the upstream transducer, generating plane waves with a downstream ultrasonic transducer having a face at least a portion of which is curved in communication with the pipe's interior and positioned so the plane waves are directed outward toward the pipe's interior wall and propagate along the pipe's interior so a full cross-section of the fluid flow in the pipe's interior can be measured; receiving the plane waves generated by the downstream transducer at the upstream transducer which produces an upstream transducer signal; receiving the plane waves generated by the upstream transducer at the downstream transducer which produces a downstream transducer signal; providing to the controller in communication with the upstream and downstream transducers the upstream and downstream signals; and calculating with the controller fluid flow rate from the upstream transducer signal and the downstream transducer signal, wherein a desired angle, φ desired, of the conical shape is defined by:

$$\phi_{Desired} = \tan^{-1}\left[\frac{\frac{D}{2} - \frac{r}{2}}{\frac{L}{2} + \sin\phi_{face} \cdot \frac{r}{z}}\right]$$

where D is the diameter of the pipe, L is the length of the pipe, r is the radius of the transducer, $$\frac{\sin\phi_{face}}{C_{window}} = \frac{\sin\phi_{refract}}{C_{fluid}}$$

$$\phi_{Desired} = \phi_{face} - \phi_{refract}.$$

9. The method of claim 8 wherein at least a portion of each face is a portion of a cone.

10. The flow meter of claim 9 wherein each face is conically shaped.

* * * * *